United States Patent
Nickel et al.

(10) Patent No.: US 12,179,576 B2
(45) Date of Patent: Dec. 31, 2024

(54) FUNNEL INSERT FOR A FILLER TUBE OF A FUEL TANK

(71) Applicant: TI Automotive Technology Center GmbH, Rastatt (DE)

(72) Inventors: Bernd M. Nickel, Karlsruhe (DE); Bernhard Springholz, Malsch (DE); Alexander Gladitsch, Sasbach (DE)

(73) Assignee: TI AUTOMOTIVE TECHNOLOGY CENTER GMBH, Rastatt (DE)

(*) Notice: Subject to any disclaimer, the term of this patent is extended or adjusted under 35 U.S.C. 154(b) by 36 days.

(21) Appl. No.: 17/289,144

(22) PCT Filed: Oct. 31, 2019

(86) PCT No.: PCT/IB2019/059348
§ 371 (c)(1),
(2) Date: Apr. 27, 2021

(87) PCT Pub. No.: WO2020/089827
PCT Pub. Date: May 7, 2020

(65) Prior Publication Data
US 2021/0379985 A1    Dec. 9, 2021

(30) Foreign Application Priority Data
Oct. 31, 2018   (EP) ..................... 18203732

(51) Int. Cl.
*B60K 15/04*    (2006.01)
*B60K 15/03*    (2006.01)

(52) U.S. Cl.
CPC .... *B60K 15/04* (2013.01); *B60K 2015/03401* (2013.01); *B60K 2015/03493* (2013.01); *B60K 2015/0458* (2013.01); *B60K 2015/048* (2013.01)

(58) Field of Classification Search
CPC .......... B60K 15/04; B60K 2015/03493; B60K 2015/0458; B60K 2015/048
See application file for complete search history.

(56) References Cited

U.S. PATENT DOCUMENTS 5,068,605 A    11/1991   Yasunaga et al.
6,056,029 A *  5/2000   Devall .................. B60K 15/04
                                                                  137/151

(Continued)

FOREIGN PATENT DOCUMENTS

DE   102008005717 A1   2/2009
EP       1541403 A2    6/2005

(Continued)

OTHER PUBLICATIONS

International Search Report and Written Opinion dated Nov. 27, 2019.

(Continued)

*Primary Examiner* — Timothy P. Kelly
(74) *Attorney, Agent, or Firm* — DICKINSON WRIGHT PLLC

(57) ABSTRACT

A funnel insert for a filler tube of a fuel tank for a motor vehicle, the funnel insert being arranged in an end region of the filler tube intended to receive a fuel nozzle, and there being a space between the outside of the funnel insert and the inside of the filler tube, in which space a fluid barrier is arranged. According to the invention, the fluid barrier is in the form of a sealing body arranged on the outer circumference of the funnel insert, which sealing body comprises a sealing lip resting on the inside of the filler tube in portions or circumferentially, and consists of a material having a higher flexibility than the material of the funnel insert.

6 Claims, 1 Drawing Sheet

(56) References Cited

U.S. PATENT DOCUMENTS

| | | |
|---|---|---|
| 6,860,398 B2 | 3/2005 | Potter et al. |
| 7,048,019 B2 | 5/2006 | Pacitto, Jr. et al. |
| 7,258,145 B2 | 8/2007 | McCracken et al. |
| 8,490,661 B1 | 6/2013 | Leipold et al. |
| 9,688,525 B2 | 6/2017 | Steinmann et al. |
| 10,065,495 B2 | 9/2018 | Salzberger et al. |
| 2002/0063129 A1 | 5/2002 | Potter et al. |
| 2005/0067050 A1 | 3/2005 | Pacitto et al. |
| 2005/0126657 A1 | 6/2005 | Allman et al. |
| 2005/0263211 A1 | 12/2005 | McCracken |
| 2007/0210607 A1 | 9/2007 | Murabayashi et al. |
| 2013/0186894 A1 | 7/2013 | Salzberger et al. |
| 2014/0326724 A1 | 11/2014 | Steinmann et al. |
| 2015/0291408 A1* | 10/2015 | Fox .................. B60K 15/04 141/1 |
| 2015/0343897 A1* | 12/2015 | Kito .................. B60K 15/04 220/86.1 |

FOREIGN PATENT DOCUMENTS

| | | |
|---|---|---|
| EP | 2719567 A1 | 4/2014 |
| EP | 2799273 A1 | 11/2014 |
| JP | H0429428 A | 1/1992 |
| JP | 2719567 B2 | 2/1998 |
| JP | 2799273 B2 | 9/1998 |
| JP | 2018162048 A | 10/2018 |
| KR | 10-2013-0105372 A | 9/2013 |
| KR | 10-2016-0150376 A | 12/2016 |

OTHER PUBLICATIONS

Leipold, S. O., et al., Machine translation of KR 10-201300105372 A, published Sep. 25, 2023.

Jung, J. H., Machine translation of KR 10-2016-0150376 A, published Dec. 30, 2016.

Nickel, B. M., et al., English translation of Notification of Reasons for Rejection for JP 2021-547976, mailed Jul. 12, 2022.

* cited by examiner

FUNNEL INSERT FOR A FILLER TUBE OF A FUEL TANK

RELATED APPLICATIONS

The present patent document claims priority to PCT Application PCT/IB2019/059348, filed Oct. 31, 2019, which claims the benefit of and priority to European Patent Application 18203732.5, filed Oct. 31, 2018, the entire contents of which are incorporated herein by reference.

FIELD

The disclosure relates to a funnel insert for a filler tube of a fuel tank for a motor vehicle, the funnel insert being arranged in an end region of the filler tube intended to receive a fuel nozzle, and there being a space between the outside of the funnel insert and the inside of the filler tube, in which space a fluid barrier is arranged.

BACKGROUND

Such funnel inserts hold and guide the outlet end of a fuel nozzle when refueling the vehicle. At the end of a complete refueling operation, the fuel flow is stopped by fuel flowing back against the fuel nozzle. In order to prevent fuel from flowing past the funnel insert on the outside and spraying out of the fill tube, a fluid barrier is arranged between the funnel insert and the filler tube. For reasons of cost, the fill tube is usually produced from HDPE plastics material with some dimensional tolerance such that some variation in wall thickness occurs, which leads to a varying gap size between the funnel insert and the fill tube, which gap size has to be allowed for by the fluid barrier, i.e. the fluid barrier must be flexible enough to bridge various distances between the funnel insert and the fill tube. It should be noted that, in contrast to the fill tube, the funnel insert has to be produced using a high-precision mold, as said insert contains a misfuelling protection device which cooperates with the fuel nozzle, and therefore is usually produced from POM or other dimensionally stable plastics materials, which are not very flexible. A sealing lip made of dimensionally stable plastics material such as POM is not able to flexibly seal the varying gap width.

SUMMARY

Proceeding from this, the problem addressed by the present disclosure is that of developing a funnel insert having a fluid barrier in such a way that tolerances with respect to the fill tube are allowed for without damage.

In order to solve this problem, the combination of features specified in claim 1 is proposed. Advantageous embodiments and developments of the disclosure will become apparent from the dependent claims.

According to the disclosure, the fluid barrier is in the form of a sealing body arranged on the outer circumference of the funnel insert, which sealing body comprises a circumferential sealing lip resting on the inside of the filler tube, and consists of a material having a higher flexibility than the material of the funnel insert. The sealing body can be produced separately from the funnel insert and arranged on the funnel insert before the funnel insert is mounted into the fill tube or can also be produced together with the funnel insert by way of a two-component injection molding process.

The funnel insert is produced from a dimensionally stable plastics material and the sealing body is produced from a flexible plastics material. Preferably, the funnel insert consists of POM plastics material and the sealing body consists of HDPE plastics material with an elongation-at-break value of over 50%. A high elongation-at-break value ensures that deformations, vibrations, displacements and the like occurring during assembly and operation do not damage the sealing body even long-term.

While the funnel insert and the sealing body can be manufactured with comparably low dimensional tolerances, tolerances of several millimeters may occur during the manufacture of the filler tube. Despite this series variance, the sealing body is supposed to ensure a reliable seal. The sealing body is thus designed such that radial dimensional deviations, namely differences of the distance between the filler tube and the funnel insert, of at least +/−5 mm relative to a target value can be compensated.

BRIEF DESCRIPTION OF THE DRAWINGS

The disclosure will be explained in more detail in the following with reference to an embodiment shown schematically in the drawings, in which.

DETAILED DESCRIPTION

Figure 1:
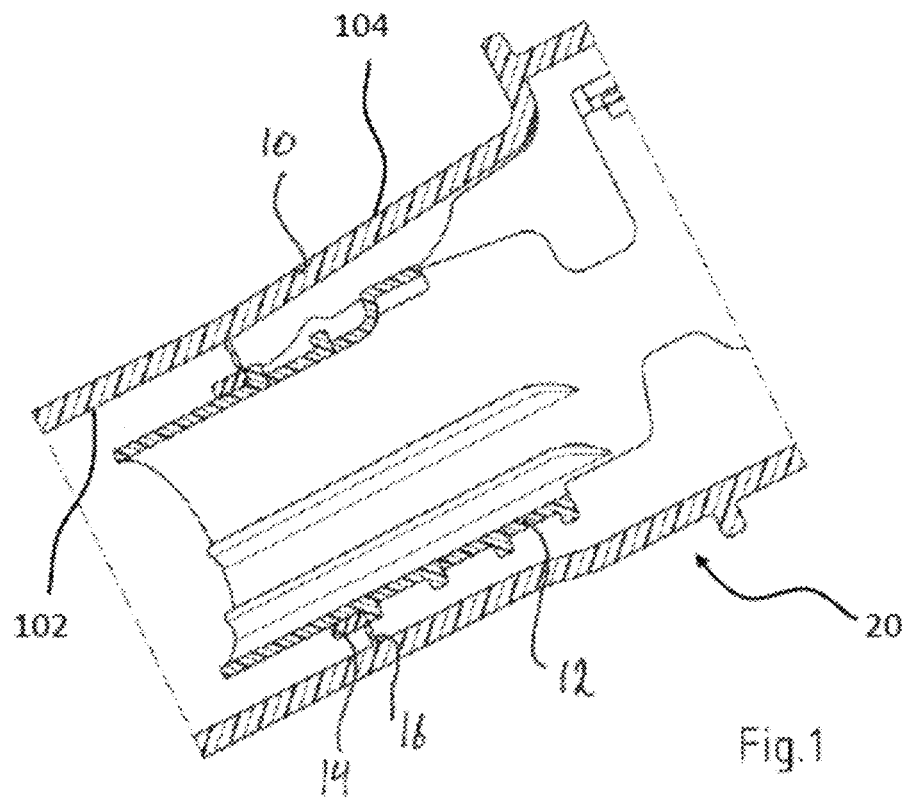
FIG. 1 is a longitudinal section through an end region of a filler tube for a fuel container, having a funnel insert for receiving a misfuelling protection device.
Figure 2:
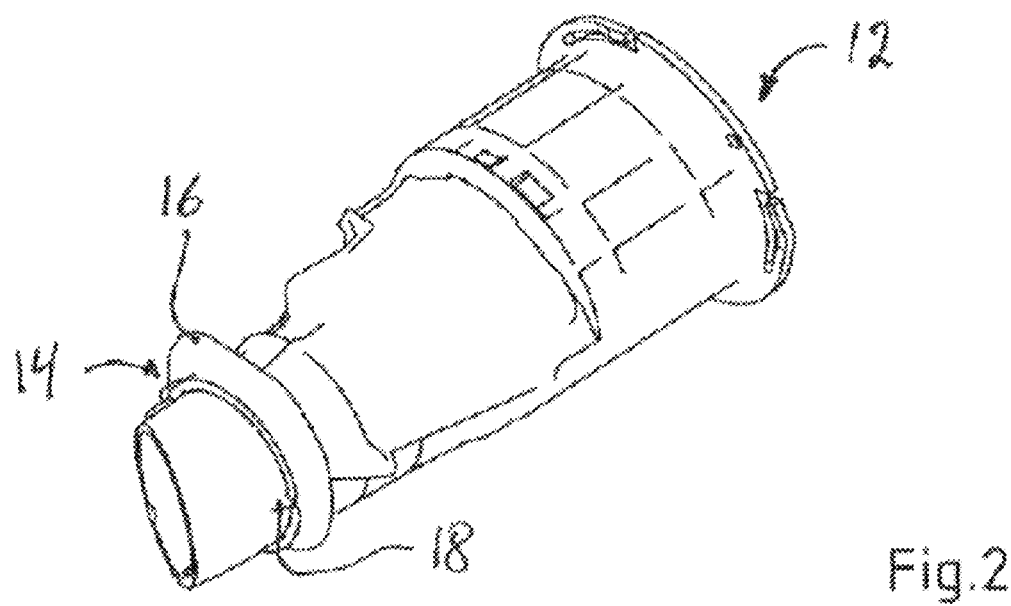
FIG. 2 is a perspective view of the funnel insert according to FIG. 1.

The fill-side end region of a filler tube 10 made of HDPE plastics material shown in FIG. 1 comprises a funnel insert 12 (FIG. 2) made of POM plastics material, which insert is in turn intended to receive a functional component (not shown in more detail). The funnel insert 12 has to be produced with high precision due to the interface with the functional component, and this justifies the use of the POM material. The filler tube 10, however, is produced from the cheaper plastics material HDPE and can vary by a few millimeters in its dimensions, in particular its wall thickness, owing to the production process.

In addition, the HDPE material may undergo expansion or shrinkage due to absorption of fuel and temperature variations.

As can be seen from FIG. 1, the funnel insert 12 is arranged in an end portion 20 of the filler tube 10 to receive a fuel nozzle (not shown). Further, the filler tube 10 has an inner surface 102 and an outer surface 104. Further, as shown in FIG. 1, an annular gap is formed between the outside of the funnel insert 12 and the inner wall of the filler tube 10. During a refueling operation, fuel should be prevented from flowing back through this annular gap toward the fill opening, which can lead to premature termination of the refueling operation. A sealing body 14 having a sealing lip 16 is therefore arranged on the funnel insert 12, which sealing lip is dimensioned in its radial extent such that it reliably allows for distance changes between filler tube 10 and funnel insert 12 which are already initially present or occur during operation. For this purpose, a degree of flexibility of the sealing lip 16 is required, which is not achieved by POM plastics material. The sealing body 14 is therefore produced from a material having greater flexibility, in particular from HDPE plastics material.

In the exemplary embodiment shown, the sealing body 14 is latched onto the funnel insert 12, for which purpose the funnel insert 12 comprises a plurality of latching projections 18 arranged over its circumference. Alternatively, the sealing body 14 can be produced together with the funnel insert 12 by a two-component injection molding process.

The invention claimed is:

1. A device for a fuel tank in a motor vehicle, the device comprising:
   a filler tube having an inner surface and an outer surface, the inner and outer surfaces facing radially, the filler tube configured to receive a fuel nozzle;
   a funnel insert arranged in an end portion of the filler tube; and
   a fluid barrier arranged in a space defined between an outside surface of the funnel insert and the radially facing inner surface of the filler tube,
   wherein the fluid barrier is in the form of a sealing body arranged on the outside surface about a circumference of the funnel insert,
   wherein the sealing body comprises a sealing lip engaged on the inner surface of the filler tube in portions or circumferentially, and consists of a material having a higher flexibility than a material of the funnel insert, and
   wherein the funnel insert comprises latching projections projecting radially outward from the funnel insert and being spaced radially inwardly from the inner surface of the filler tube such that the sealing body is latched onto the funnel insert by means of the latching projections.

2. The funnel insert according to claim 1, wherein the funnel insert consists of POM material and the sealing body consists of HDPE material.

3. The funnel insert according to claim 1, wherein the sealing body is produced together with the funnel insert in a two-component injection molding process.

4. The funnel insert according to claim 1, wherein the sealing body is adhesively bonded, welded, clamped or riveted to the funnel insert.

5. The funnel insert according to claim 1, wherein the sealing body has an elongation-at-break value of over 50%.

6. The funnel insert according to claim 1, wherein a distance of 10 to 30 mm is present between the filler tube and the funnel insert.

* * * * *